Patented Sept. 30, 1941

2,257,293

UNITED STATES PATENT OFFICE 2,257,293

MANUFACTURE OF HYDROCARBONS

Henry Dreyfus, London, England

No Drawing. Application February 1, 1938, Serial No. 188,063. In Great Britain February 19, 1937

3 Claims. (Cl. 260—449)

This invention relates to the manufacture of hydrocarbons by reaction between carbon monoxide and hydrogen.

According to the invention hydrocarbons are manufactured by subjecting a mixture comprising carbon monoxide, hydrogen and a diluent gas or vapor to elevated temperatures in the presence of a catalyst.

As the diluent gas or vapor there may be employed steam, if desired together with one or more other diluents, especially carbon dioxide and hydrocarbon gases and vapors.

According to the invention a mixture of carbon monoxide and hydrogen is produced in a single operation which simultaneously yields at least part of the diluent required for the subsequent formation of the hydrocarbons. Thus, a mixture of carbon monoxide, any desired proportion of hydrogen, and steam is introduced into the reaction zone, and the steam, besides acting itself as a diluent, reacts with part of the carbon monoxide to produce hydrogen and carbon dioxide. When hydrogen and carbon dioxide are to be made in the reaction zone by this method, it is preferable to have in the reaction zone a catalyst for the reaction $CO + H_2O \rightarrow CO_2 + H_2$ as well as a catalyst for the reduction of carbon monoxide with hydrogen to give hydrocarbons. These two catalysts may be in admixture with each other or may be arranged so that the gas flows first over the catalyst for the reaction $CO + H_2O \rightarrow CO_2 + H_2$ and then over the catalyst for the hydrocarbon synthesis. It may sometimes be most advantageous to employ as catalyst a single substance which catalyses both reactions, e. g. nickel. In any case it will usually be preferable to arrange that successive parts of the reaction zone are heated to different degrees; thus the temperature in the first part of the zone may be about 400°–500° C. so as to promote the reaction between carbon monoxide and steam, and the second part of the zone may be maintained at a temperature suited to the reaction between carbon monoxide and hydrogen, as is more fully described below. If desired instead of or as well as having some hydrogen in the mixture before the reduction of the steam, sufficient may be added afterwards to bring the carbon monoxide and hydrogen ratio to the desired figure.

The proportion of diluent present in the reaction mixture for the formation of hydrocarbons may vary over a wide range; preferably at least as much diluent as carbon monoxide is present, and advantageously for each part of carbon monoxide there may be present 1½, 2, 3, 5, 10 or more parts by volume of diluent.

While the volume of hydrogen present in this reaction mixture may be less than or equal to that of the carbon monoxide, it is preferable to employ an excess of hydrogen. For example, the mixture may contan 1½, 2, 3, 4, or even more volumes of hydrogen for each volume of carbon monoxide.

The temperature to be employed in the formation of hydrocarbons will vary according to the products desired. For example, for the production of normally liquid hydrocarbons, the gases may be subjected to a temperature between 150° and 250° C., and especially between 180° and 200° C. When hydrocarbons of lower molecular weight are required, the temperature employed may exceed 250° C., and may, for instance, be about 300°, 400°, 500° C., or higher. For example, temperatures of the order of 330° to 380° or 400° C. are particularly useful when methane is the desired product. If desired, the gases may be preheated before entering the reaction zone. Preferably the pressure is atmospheric or does not greatly exceed atmospheric.

The method of operating the process may also vary with the nature of the principal products which are desired. Thus when permanent gases, e. g. methane and ethane, are the main products of the reaction, good results may be obtained by a straight run method, the reaction mixture being fed into the reaction zone or zones at one end and products being withdrawn at the other. If substantial quantities of condensible hydrocarbons are formed, these may be separated from the gaseous products and employed as diluent in the treatment of further quantities of hydrogen and carbon monoxide. If desired a cyclic method may be adapted wherein the gases and vapors leaving the reaction zone or zones are fed back to some earlier point in the system for further reaction. In this case the hydrocarbons formed in an earlier passage through the zone act as diluent in a later one. When the hydrocarbon content has built up to a sufficient extent the cycle may be broken and the products withdrawn.

When liquefiable hydrocarbons are the main products of the reaction, a straight-run process may again be used; cyclic processes are however of value: for example after each passage of the reagents through the reaction zone liquefiable hydrocarbons may be removed therefrom by condensation either wholly or, if part of the hydrocarbons is to be recycled as diluent, to any desired degree. Further reagent gases, with or without further quantities of diluent, may be introduced into the cycle to replace those which have already reacted.

While the reaction between carbon monoxide and hydrogen, especially in a straight-run process, may be carried out as a single stage operation, particularly when methane is the principal product desired, it is frequently advantageous to employ a plurality of stages. The reaction proceeds more slowly at the relatively low temperatures employed to produce liquefiable hydrocarbons, and therefore a multi-stage process is particularly valuable when liquid hydrocarbons are required. Preferably liquid hydrocarbons formed in any one stage are wholly or largely removed, e. g. by condensation, immediately after that stage.

Among the catalysts which may be employed in the formation of hydrocarbons are suitable metallic and other hydrogenating catalysts, for example metals of the eighth group of the periodic table, especially nickel and cobalt. These hydrogenating catalysts may be employed in admixture with other catalysts or activating agents, preferably dehydrating catalysts, e. g. alumina, magnesia, thoria and the like. The catalysts, whether simple or mixed, may be employed in association with a carrier. For example, they may be deposited on charcoal, silica gel, pumice, asbestos or the like. On the other hand self-supporting catalyst masses may be used with advantage, and in particular a shaped nickel-alumina or similar catalyst prepared as described in U. S. Patent No. 2,151,329, dated March 21, 1939.

The catalyst may, for example, be contained in heated tubes through which the gas mixtures are passed. Preferably the dimensions and structure of the tubes are such that a high degree of turbulence is imparted to the gases so as to ensure good contact between the gases and the catalyst and to secure efficient heating throughout the gas mixture. For example, relatively narrow tubes may be used with a correspondingly high rate of gas flow, or the masses of catalyst may be so disposed as to break up the gas stream. A similar effect may be attained by inserting baffles at suitable intervals along the length of the reaction tube. The tubes and/or the baffles contained therein may be made of, or lined or covered with, a catalytic metal.

Instead of tubes, there may be employed reaction zones of annular cross-section, or any other suitable type of apparatus may be used. For example, the reagents and diluent may be passed through a heated inert liquid containing a catalyst in solution or suspension.

Having described my invention what I desire to secure by Letters Patent is:

1. Process for the production of hydrocarbons which comprises passing a mixture of carbon monoxide and steam over a catalytic mass adapted to produce carbon dioxide and hydrogen from the said mixture, and to catalyze the reduction of carbon monoxide with hydrogen, the gas mixture first coming into contact with the catalytic mass at a temperature of 400° to 500° C. to convert part of the carbon monoxide to carbon dioxide, and then while the steam content of the gas mixture formed at said temperature is maintained into contact with the catalytic mass at a temperature of 150° to 250° C.

2. Process for the production of hydrocarbons, which comprises passing a mixture of carbon monoxide and steam over a mixture of a catalyst adapted to produce carbon dioxide and hydrogen therefrom and a catalyst for the reduction of carbon monoxide with hydrogen, the gas mixture first coming into contact with the catalyst mixture at a temperature of 400° to 500° C. to convert part of the carbon monoxide to carbon dioxide and then, while the steam content of the gas mixture formed at said temperature is maintained, into contact with the catalyst mixture at a temperature of 150° to 250° C.

3. Process for the production of hydrocarbons, which comprises passing a mixture of carbon monoxide and steam over a nickel catalyst, the gases first coming into contact with the catalyst at a temperature of 400° to 500° C. to convert part of the carbon monoxide to carbon dioxide and then, while the steam content of the gas mixture formed at said temperature is maintained, into contact with the catalyst at a temperature of 150° to 250° C.

HENRY DREYFUS.